(12) United States Patent
Tremblay et al.

(10) Patent No.: US 10,221,599 B2
(45) Date of Patent: Mar. 5, 2019

(54) ADJUSTMENT DEVICE

(71) Applicant: Bombardier Inc., Dorval (CA)

(72) Inventors: Michel Tremblay, Ste-Dorothe (CA); Martin Mahaits, St-Hippolyte (CA)

(73) Assignee: Bombardier Inc., Dorval (CA)

( * ) Notice: Subject to any disclaimer, the term of this patent is extended or adjusted under 35 U.S.C. 154(b) by 64 days.

(21) Appl. No.: 15/024,101

(22) PCT Filed: Sep. 25, 2014

(86) PCT No.: PCT/IB2014/064835
§ 371 (c)(1),
(2) Date: Mar. 23, 2016

(87) PCT Pub. No.: WO2015/044895
PCT Pub. Date: Apr. 2, 2015

(65) Prior Publication Data
US 2016/0215545 A1    Jul. 28, 2016

Related U.S. Application Data

(60) Provisional application No. 61/883,396, filed on Sep. 27, 2013.

(51) Int. Cl.
*B60R 13/00* (2006.01)
*E05D 7/04* (2006.01)
(Continued)

(52) U.S. Cl.
CPC ........ *E05D 7/0415* (2013.01); *B64D 11/0636* (2014.12); *E06B 3/385* (2013.01)

(58) Field of Classification Search
CPC ......... Y10T 16/53235; Y10T 16/53225; Y10T 16/53253; E05D 7/0415; E06B 3/385; B64D 11/0636
(Continued)

(56) References Cited

U.S. PATENT DOCUMENTS 4,185,357 A    1/1980    Busse
4,485,524 A *  12/1984   Neville ................... E05D 7/081
                                                    16/241
(Continued)

FOREIGN PATENT DOCUMENTS

CA    2334751 A1 *  8/2001    ............... E05D 7/04
CA    2363781 A1 *  6/2002    ........... E05D 7/0415
(Continued)

OTHER PUBLICATIONS

The State Intellectual Property Office of the People's Republic of China; Office Action dated Jan. 20, 2017 re: China patent application No. 201480053105.1.
(Continued)

*Primary Examiner* — Jerry E Redman
(74) *Attorney, Agent, or Firm* — Norton Rose Fulbright Canada LLP (57) ABSTRACT

Devices and assemblies for adjusting a position of a movable body (24) are disclosed. An exemplary device for adjusting a position of a body rotatable about a hinge axis comprises: a first portion (36a) configured to be secured to a structure (32a); and a second portion (38a) adjustably coupled to the first portion and configured to be rotatably coupled to the body. The second portion comprises an adjustment mechanism for adjusting the body along the hinge axis relative to the second portion.

12 Claims, 10 Drawing Sheets

(51) Int. Cl.
*B64D 11/06* (2006.01)
*E06B 3/38* (2006.01)

(58) Field of Classification Search
USPC .................................................... 296/24.34
See application file for complete search history.

(56) References Cited

U.S. PATENT DOCUMENTS

| | | | | |
|---|---|---|---|---|
| 4,490,883 | A * | 1/1985 | Gauron | B64C 1/066 |
| | | | | 16/245 |
| 4,847,947 | A * | 7/1989 | Tsong-Chi | E05D 7/0407 |
| | | | | 16/235 |
| 5,379,487 | A * | 1/1995 | Bowers | E05D 7/0407 |
| | | | | 16/236 |
| 7,516,516 | B2 | 4/2009 | Wu | |
| 7,653,967 | B2 | 2/2010 | Lowe et al. | |
| 7,934,679 | B2 | 5/2011 | Bock et al. | |
| 9,752,374 | B2 * | 9/2017 | Fu | E06B 3/509 |
| 2007/0289093 | A1 * | 12/2007 | Nallamottu | E05D 7/0407 |
| | | | | 16/236 |
| 2008/0271291 | A1 * | 11/2008 | Chen | E05D 7/0407 |
| | | | | 16/238 |

FOREIGN PATENT DOCUMENTS

| | | | | |
|---|---|---|---|---|
| CA | 2925244 | A1 * | 4/2015 | .......... E05D 7/0415 |
| CH | 671066 | A5 * | 7/1989 | .............. E05D 5/02 |
| CN | 1950256 | A | 4/2007 | |
| CN | 201818165 | U | 5/2011 | |
| DE | 2635237 | A1 * | 2/1978 | .......... E05D 5/0276 |
| DE | 2654792 | A1 * | 6/1978 | .......... E05D 7/0407 |
| DE | 10054238 | A1 * | 5/2002 | .......... E05D 7/0407 |
| DE | 202012104583 | U1 | 3/2013 | |
| EP | 2105561 | A2 * | 9/2009 | ............. E05D 3/186 |
| GB | 796887 | | 6/1958 | |
| JP | WO 2015068714 | A1 * | 5/2015 | .......... E05D 7/0407 |
| WO | WO 2007114709 | A1 * | 10/2007 | ............... E05D 7/02 |
| WO | 2012040945 | A2 | 4/2012 | |

OTHER PUBLICATIONS

English translation of China patent document No. CN 201818165U dated May 4, 2011; www.google.ca/patents/ . . . .

English translation of China patent document No. CN 1950256A dated Apr. 18, 2007; www.google.tl/patents/ . . . .

PCT international Search Report and Written Opinion dated Nov. 23, 2015 re: International Application No. PCT/IB2014/064835.

English translation of Patent Publication No. WO2012040945 dated Apr. 5, 2012.

English translation of Patent Application No. DE 20 2012 104583 dated Mar. 5, 2013.

The State Intellectual Property Office of the People's Republic of China; Notification of Second Office Action dated Aug. 11, 2017 re: China patent application No. 201480053105.1.

The State Intellectual Property Office of the People's Republic of China; Notification of Third Office Action dated Feb. 24, 2018 re: China patent application No. 201480053105.1.

European Patent Office, Communication Pursuant to Article 94(3) EPC dated Jul. 31, 2018 re: Application No. 14790730.7.

* cited by examiner

ADJUSTMENT DEVICE

CROSS-REFERENCE TO RELATED APPLICATION

This application is a national phase application under 35 U.S.C. 371 of International Patent Application No. PCT/IB2014/064835 filed on Sep. 25, 2014, which claims priority from U.S. Provisional Patent Application Ser. No. 61/883,396, filed on Sep. 27, 2013, the entire content of which is incorporated herein by reference.

TECHNICAL FIELD

The disclosure relates generally to positional adjustment, and more particularly to positional adjustment of movable bodies such as panels, doors and lids relative to other structure.

BACKGROUND OF THE ART

Aircraft interiors typically comprise doors and panels that are movably coupled to and cooperate with other neighboring structures. For example, some aircraft interiors include side ledges near walls and/or passenger seats. Such side ledges can include nested panels that are hinged and movable between open and closed positions to provide access to storage components within such side ledges. Since such hinged panel may form part of the side ledge surface together with one or more other fixed or movable panels, the hinged panel must be carefully installed so that the hinged panel is substantially aligned with any neighboring panel(s) so that the hinged panel and the neighboring panel, together can define a relatively even side ledge surface. The installation of such hinged panel can be affected by dimensional variations between components and can, in some cases, require re-work which can be time consuming and/or expensive.

Improvement is therefore desirable.

SUMMARY

The disclosure describes components, devices and assemblies that may be useful in positional adjustment. For example, components, devices and assemblies disclosed herein may be useful in positional adjustment of movable (e.g., rotatable and/or translatable) components such as panels, doors, lids or other movable bodies relative to other structure. Such components, devices and assemblies as disclosed herein may be useful in some aircraft applications such as for providing positional adjustment of a movable panels which may be part of a side ledge or of other parts of an aircraft interior.

In one aspect, the disclosure describes a device for adjusting a position of a body relative to a structure where the body is rotatable about a hinge axis. The device may comprise:

a first portion configured to be secured to the structure; and a second portion adjustably coupled to the first portion and configured to be rotatably coupled to the body, the second portion comprising an adjustment mechanism for adjusting the body along the hinge axis relative to the second portion.

The adjustment mechanism of the second portion may comprise an adjustment screw configured to cause translation of the body along the hinge axis upon rotation of the adjustment screw.

The adjustment screw and the body may be rotatably coupled to each other.

The adjustment screw may be configured to cause translation of a coupling member coupled to the rotatable body upon rotation of the adjustment screw.

The coupling member and the adjustment screw may be rotatably coupled to each other.

The coupling member and the adjustment screw may be substantially coaxial.

The coupling member may extends through the adjustment screw and the adjustment screw may be translatable along the hinge axis.

The coupling member and the adjustment screw may be axially secured to each other.

The adjustment screw may be substantially coaxial with the hinge axis.

The second portion may be adjustable relative to the first portion along a first direction and a second direction transverse to the first direction, the first direction and the second direction being transverse to the hinge axis.

The first portion may be configured to be secured to a surface that is transverse to the hinge axis.

In another aspect, the disclosure describes a device for adjusting a position of a body relative to a structure where the body is rotatable about a hinge axis. The device may comprise:

a first portion configured to be secured to the structure, the first portion comprising a first adjustment mechanism and a second adjustment mechanism; and a second portion coupled to the first portion and configured to be rotatably coupled to the body, the second portion being adjustable relative to the structure via the first adjustment mechanism and the second adjustment mechanism of the first portion, the second portion comprising a third adjustment mechanism for adjusting the body along the hinge axis.

The first adjustment mechanism may be configured to permit adjustment of the second portion along a first direction. The second adjustment mechanism may be configured to permit adjustment of the second portion along a second direction transverse to the first direction.

The first direction and the second direction may be transverse to the hinge axis.

The first portion may be configured to be secured to a surface that is transverse to the hinge axis.

The third adjustment mechanism may comprise an adjustment screw configured to cause translation of the rotatable body along the hinge axis upon rotation of the adjustment screw.

The adjustment screw and the rotatable body may be rotatably coupled to each other via a bearing.

In a further aspect, the disclosure describes an assembly. The assembly may comprise:

a panel movable between a closed position and an open position relative to a structure to provide access to a compartment, the panel being rotatable about a hinge axis;

a first device configured to rotatably couple the panel to the structure, the first device comprising a first base portion configured to be secured to the structure and a first head portion coupled to the base portion and rotatably coupled to the panel, the first head portion comprising an adjustment mechanism for adjusting the panel along the hinge axis; and a second device configured to rotatably couple the panel to the structure, the second device comprising a second base portion configured to be secured to the structure and a second head portion coupled to the second base portion and rotatably coupled to the panel, the second head portion permitting adjustment of the panel along the hinge axis.

The first base portion may be configured to be secured to a first wall transverse to the hinge axis.

The second base may be configured to be secured to a second wall transverse to the hinge axis. The first device and the second device may be spaced apart along the hinge axis.

The adjustment mechanism of the first head portion may comprise an adjustment screw configured to cause translation of the panel along the hinge axis upon rotation of the adjustment screw.

The first head portion may be adjustable relative to the first base portion along a first direction and a second direction transverse to the first direction, the first direction and the second direction being transverse to the hinge axis.

The second head portion may be adjustable relative to the second base portion along a first direction and a second direction transverse to the first direction, the first direction and the second direction being transverse to the hinge axis.

The first head portion may be adjustable relative to the first base portion along the first direction and the second direction.

The second device may comprise a damper dampening the movement of the panel.

The panel may be part of a side ledge of an aircraft interior.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Aspects of various embodiments are described through reference to the drawings.

Figure 1:
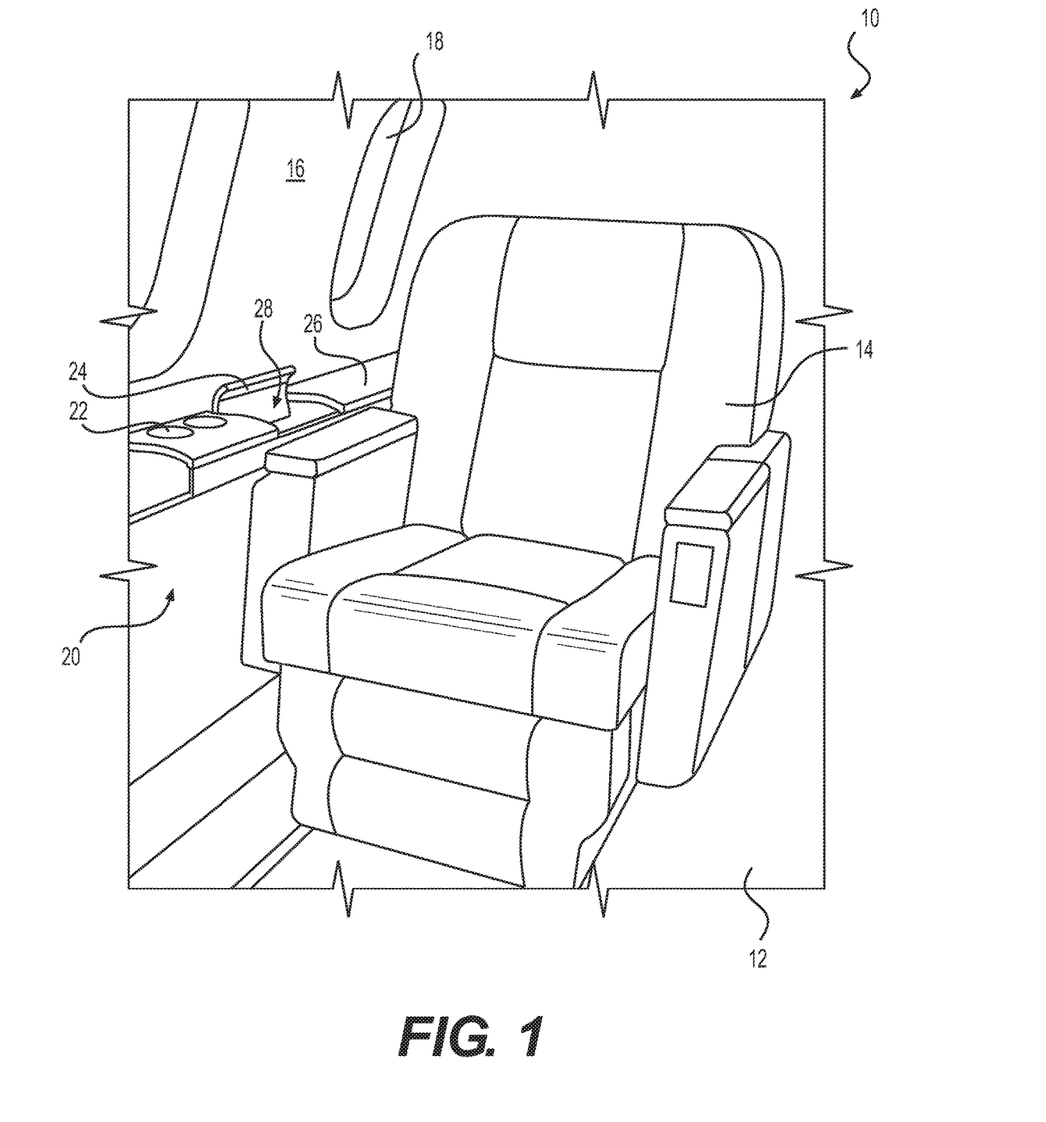
FIG. 1 is an axonometric view of an interior of an aircraft comprising a side ledge having a movable panel in an open position.

FIG. 1 illustrates a portion of an interior 10 of an aircraft such as corporate, private, commercial or other type of aircraft. Aircraft interior 10 may comprise floor 12, one or more seats 14 secured to floor 12, one or more walls 16, one or more windows 18 and one or more side ledges 20. Side ledge(s) 20 may be disposed in any suitable portion(s) of the aircraft. For example, side ledge 20 may be disposed in a passenger cabin and/or in a cockpit of the aircraft. Side ledge 20 may be disposed adjacent wall 16 and/or seat 14. For example, side ledge 20 may be disposed between two seats 14 and/or between one or more seats 14 and wall 16.

Side ledge 20 may comprise one or more features of convenience to one or more passengers, pilots and/or crew members such as one or more cup holders 22, for example. Side ledge 20 may also comprise one or more movable panels 24 and one or more adjacent panels 26. Adjacent panel 26 may be fixed or may also be movable. Movable panel 24 may be movable relative to adjacent panel 26 and may be substantially nested in side ledge 20. For example, movable panel 24 may be hinged and rotatably movable relative to adjacent panel 26. It is understood that movable panel 24 could alternatively be translatable, or, be translatable in addition to being rotatable. Movable panel 24 may serve as a lid and provide access to one or more compartments 28 within side ledge 20. Movable panel 24 may be movable between a closed position where movable panel 24 and adjacent panel 26 may cooperate to provide a ledge upper surface, and, an open position where movable panel 24 may provide access to compartment 28. Movable panel 24 is shown in the open position in FIG. 1.

Figure 2:
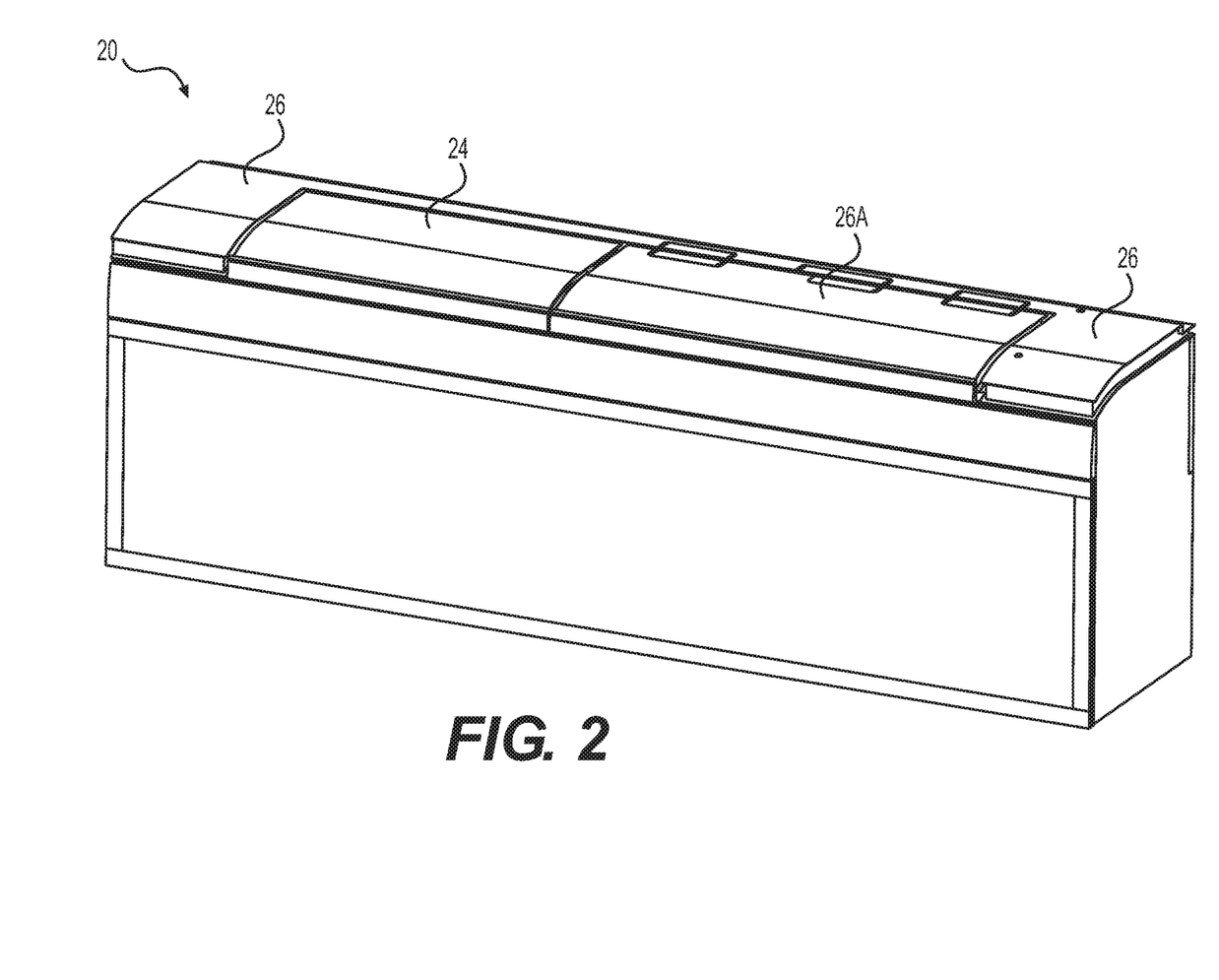
FIG. 2 is an axonometric view of the side ledge of FIG. 1 with the movable panel in a closed position.

FIG. 2 shows side ledge 20, where movable panel 24 is in a closed position. Cup holders 22 shown in FIG. 1 are not show in FIG. 2. For example, a portion 26A of adjacent panel 26 may be hinged and the position of which may or may not be adjustable. As mentioned above, movable panel 24 and adjacent panel 26 may cooperate to provide a ledge upper surface. Accordingly, it may be desirable, for esthetic and/or utilitarian reasons that movable panel 24 and adjacent panel 26 be relatively aligned (e.g., substantially flush to each other) when movable panel 24 is in the closed position so that the ledge upper surface formed by movable panel 24 and adjacent panel 26 may be relatively even. Accordingly, one or more of the devices described below may be used to provide positional adjustment of movable panel 24 relative to adjacent panel(s) 26 or other neighboring fixed or movable structure(s). Such one or more devices may serve to adjust movable panel 24 during initial installation and/or may be used to adjust movable panel 24 during maintenance activities.

Figures 3A, 3B:
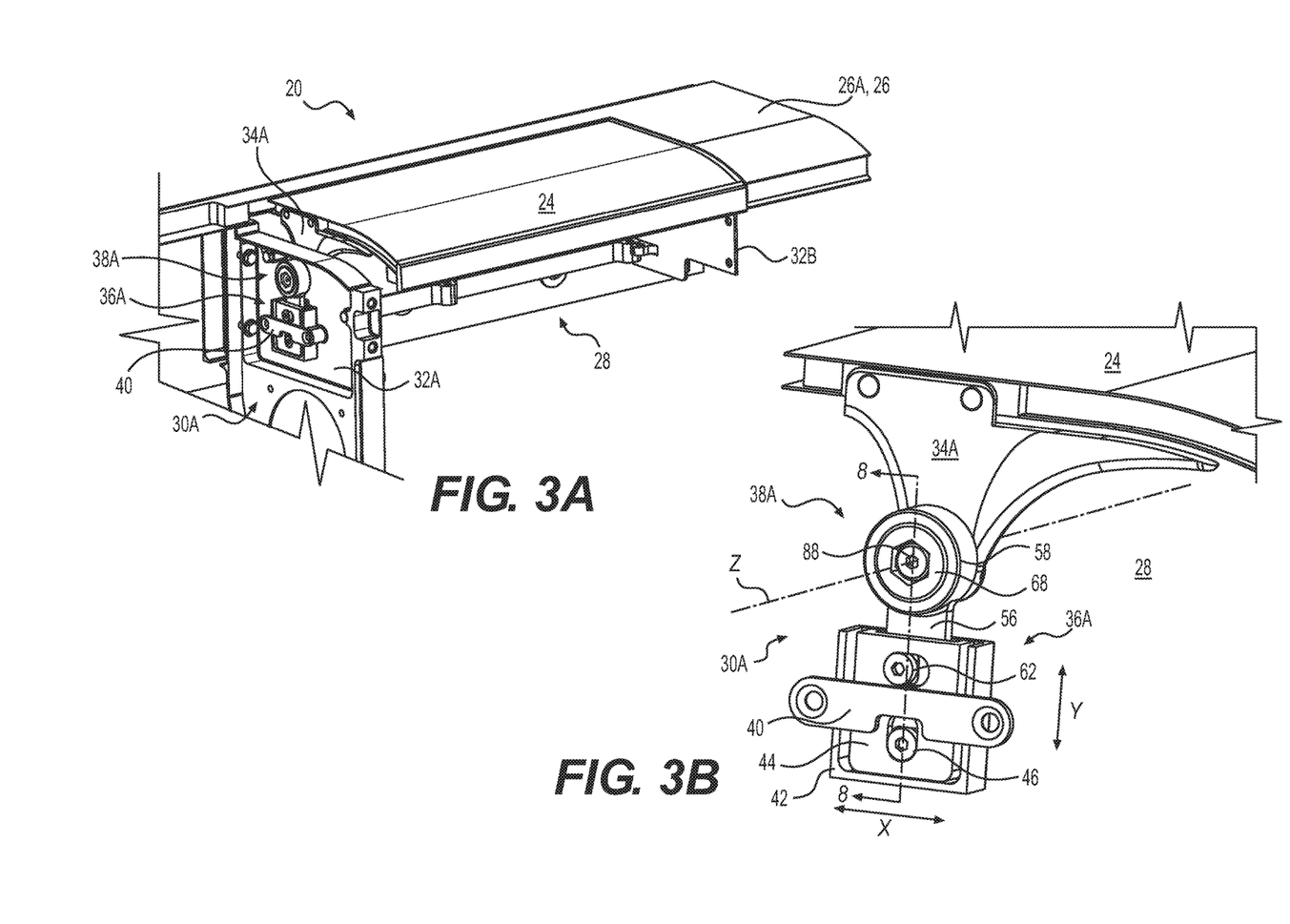
FIGS. 3A and 3B are axonometric views of a first device for adjusting a position of the movable panel of FIG. 1.

FIGS. 3A and 3B show an exemplary first device 30A that may be used to adjust movable panel 24. Movable panel 24 may be rotatable about hinge axis Z. In some applications, one or more other devices may be used in addition to device 30A to provide positional adjustment of movable panel 24. For example, while first device 30A may be positioned near one lateral side of movable panel 24, it may be desirable in some applications that another device similar to or different from device 30A be positioned near an opposite lateral side of movable panel 24, as explained further below. Accordingly, side ledge 20 may comprise an assembly of components including movable panel 24 and one or more adjustment devices as described herein.

For example, first device 30A may be used to support movable panel 24, while also permit positional adjustment of movable panel 24 relative to a structure. Such structure may include fixed structural components within the aircraft interior. Such structure may also include adjacent panel 26 even though there may be intermediate structural components between movable panel 24 and adjacent panel 26. For example, first device 30A may be configured to be secured to wall 32A and also coupled to movable panel 24 via arm 34A.

Wall 32A may include and/or be part of a structural member within side ledge 20. Wall 32A may for example define a portion of storage compartment 28, which may also be partially defined (e.g., covered) by movable member 24 when movable member 24 is in the closed position. Wall 32A may be oriented transversely (e.g., perpendicular) to hinge axis Z. First device 30A may comprise base portion 36A configured to be secured to wall 32A and head portion 38A configured to be rotatably coupled to movable panel 24 via arm 34A. Base portion 36A may be configured to be secured to a side of wall 32A opposite storage compartment 28. For example, base portion 36A may be secured to wall 32A via one or more brackets 40 and/or one or more suitable fasteners (not shown). Head portion 38A may be adjustably coupled to base portion 36A. For example, head portion 38A may be adjustable along one or more directions (e.g., X and/or Y) relative to base portion 36A and/or relative to wall 32A. Head portion 38A may comprise an adjustment mechanism, which is explained further below, for adjusting the position of movable panel 24 along (e.g., substantially parallel to) hinge axis Z. The X and Y directions may be transverse (e.g., perpendicular) to each other and also transverse (e.g., perpendicular) to hinge axis Z.

Figure 4A:
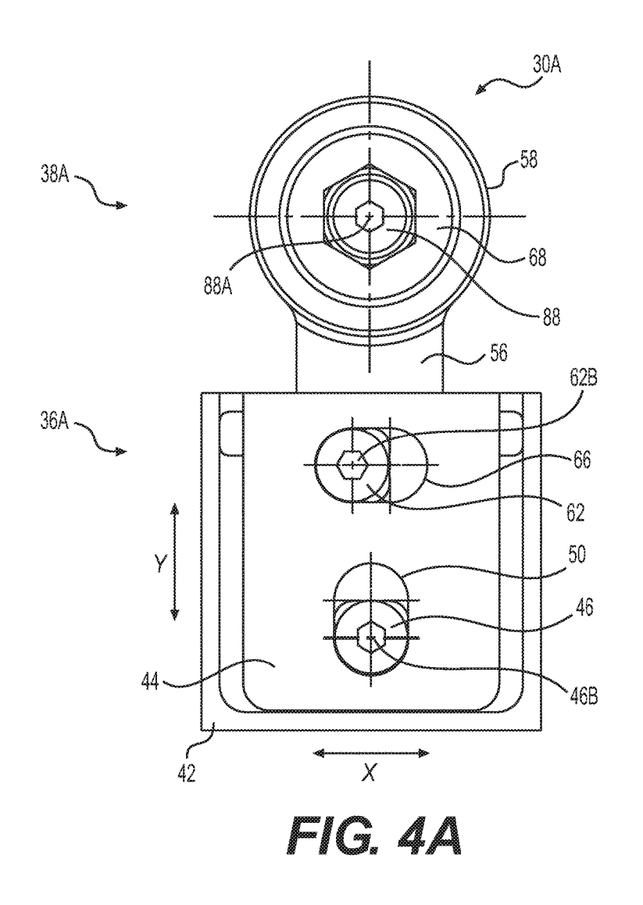
FIGS. 4A and 4B are elevation views showing opposite sides of the first device of FIGS. 3A and 3B.
Figure 4B:
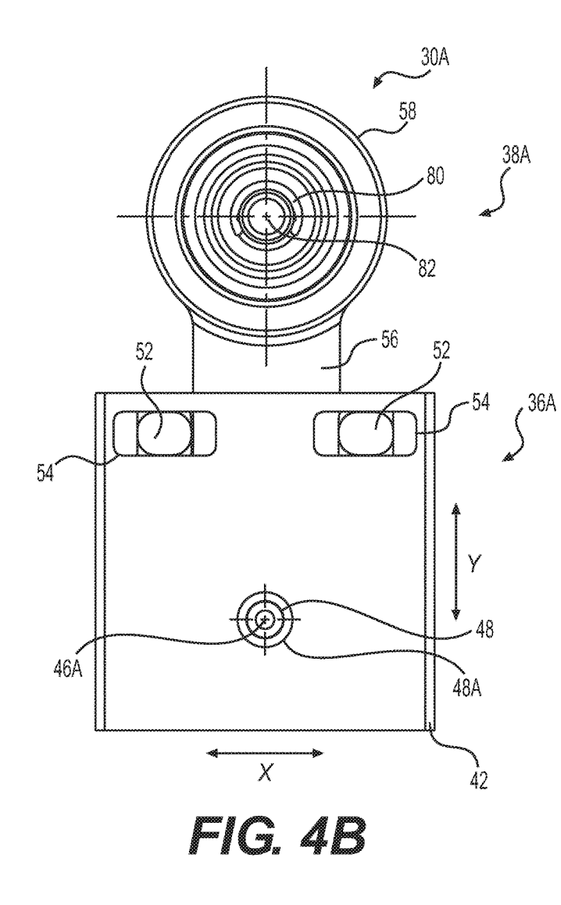

FIGS. 4A and 4B show opposite sides of first device 30A. FIG. 4A shows a side of first device 30A opposite of wall 32A and FIG. 4B shows a side of first device 30A configured to be installed against (e.g., interface with) wall 32A. Base portion 36A may comprise one or more adjustment mechanisms to provide positional adjustment of head portion 38A along the X and/or the Y direction. For example, base portion 36A may comprise casing 42 and inner block 44. Casing 42 may be configured to be secured to wall 32A using bracket 40. However, it is understood that casing 42 could be secured to wall 32A using other means. Inner block 44 may be movable along the X direction within casing 42. For example, the position of inner block 44 may be adjustable within a certain range along the X direction via cam screw 46. Cam screw 46 may be eccentric and engage both casing 42 and inner block 44. For example, cam screw 46 may engage casing 42 via hole 48 and engage inner block 44 via slot 50 so that the rotation of cam screw 46 may cause movement of inner block 44 along the X direction relative to casing 42. Inner block 44 may also comprise one or more pads 52 configured to engage slots 54 formed in casing 42 and thereby guide the movement of inner block 44 within casing 42 along the X direction. Cam screw 46 may comprise flaring end 46A and hole 48 may comprise counter-bore 48A. After insertion through hole 48, flaring end 46A of cam screw 46 may be flared into counter-bore 48A so that inner block 44 may become attached to housing 42 via cam screw 46. Cam screw 46 may comprise socket 46B or other torque-transmitting feature(s) for engagement with a suitable wrench or other type of driver.

Head portion 38A may comprise tab 56 secured to and extending from head body 58. Tab 56 may be configured to extend into and engage inner block 44 via slot 60 (shown in FIG. 7) so that movement of inner block 44 along the X direction may also cause movement of head portion 38A along the X direction. The position of head portion 38A may be adjustable along the Y direction. For example, the position of head portion 38A relative to inner block 44 may be adjusted along the Y direction via cam screw 62. Cam screw 62 may be eccentric and engage both inner block 44 and tab 56 of head portion 38A.

Figure 5:
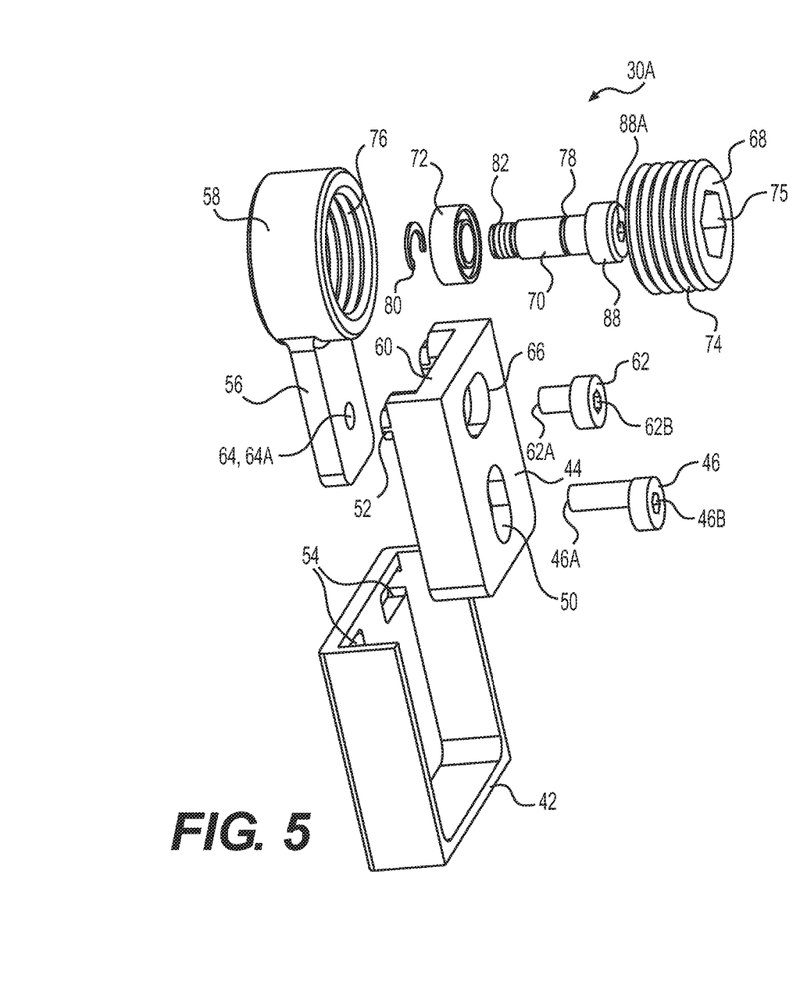
FIG. 5 is an exploded axonometric view of the first device of FIGS. 3A and 3B.

FIG. 5 shows an exploded view of first device 30A. For example, cam screw 62 may engage tab 56 via hole 64 and engage inner block 44 via slot 66 so that the rotation of cam screw 62 may cause movement of tab 56 along the Y direction relative to inner block 44. The movement of tab 56 along the Y direction may be guided by slot 60 (see FIG. 7) formed in inner block 44. Cam screw 62 may comprise flaring end 62A and hole 64 may comprise counter-bore 64A. After insertion through hole 64, flaring end 62A of cam screw 62 may be flared into counter-bore 64A (see also FIG. 8) so that inner tab 56 may become attached to inner block 44 via cam screw 62. Cam screw 62 may comprise socket 62B or other torque-transmitting feature(s) for engagement with a suitable wrench or other type of driver.

Head portion 38A of first device 30A may be configured to provide adjustment of movable panel 24 along hinge axis Z relative to wall 32A and/or other structural components. For example, head portion 38A may comprise adjustment screw 68, coupling member 70 and bearing 72 disposed between adjustment screw 68 and coupling member 70. Outer surface 74 of adjustment screw 68 may be threaded for engagement with corresponding threads on inner surface 76 of head body 58. Adjustment screw 68 may comprise interface 75 configured to receive an "Allen" type wrench (not shown) or other suitable driver suitable for turning adjustment screw 68 and effecting adjustment of movable panel 24 along hinge axis Z. Coupling member 70 may comprise a pin-shaped component that is rotatably coupled to adjustment screw 68 via bearing 72. Accordingly, coupling member 70 may be permitted to rotate freely inside of adjustment screw 68. Coupling member 70 may comprising groove 78 and cooperating c-clip 80, which may be used to axially secure coupling member 70 to bearing 72 and consequently to adjustment screw 68. Coupling member 70 may extend through adjustment screw 68 and may be used to couple to movable panel 24 via threaded portion 82 on coupling member 70. For example, coupling member 70 may be substantially coaxial with adjustment screw 68 and also substantially coaxial with hinge axis Z.

Figure 6:
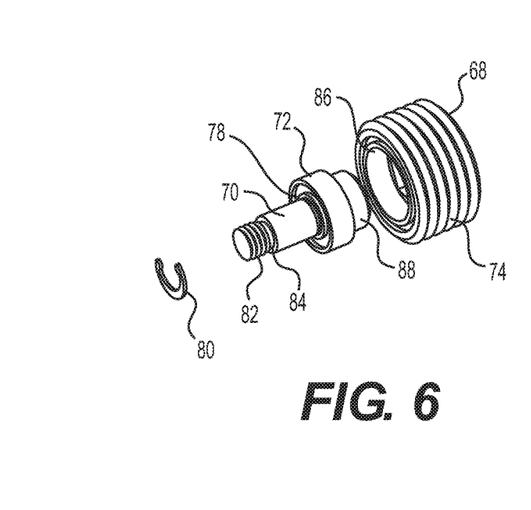
FIG. 6 is an exploded axonometric view of a coupling member and an adjustment screw of the first device of FIGS. 3A and 3B.

FIG. 6 is an exploded axonometric view of coupling member 70 and adjustment screw 68 of first device 30A. Coupling member 70 further comprises shoulder surface 84 adjacent threaded portion 82. Adjustment screw 68 may comprise swaging lip 86, which may be used to secure bearing 72 inside adjustment screw 68 by rotary swaging.

Figure 7:
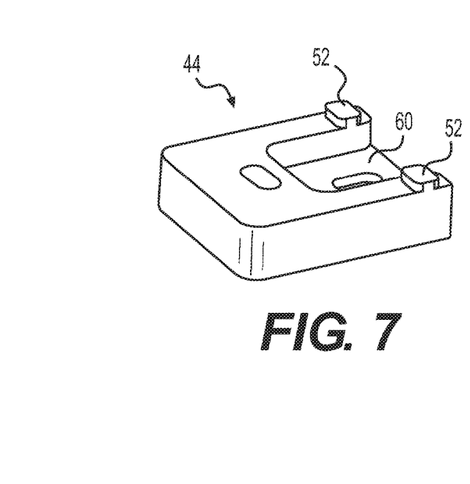
FIG. 7 is an axonometric view of an inner block of the first device of FIGS. 3A and 3B.

FIG. 7 is an axonometric view of inner block 44 of first device 30A.

Figure 8:
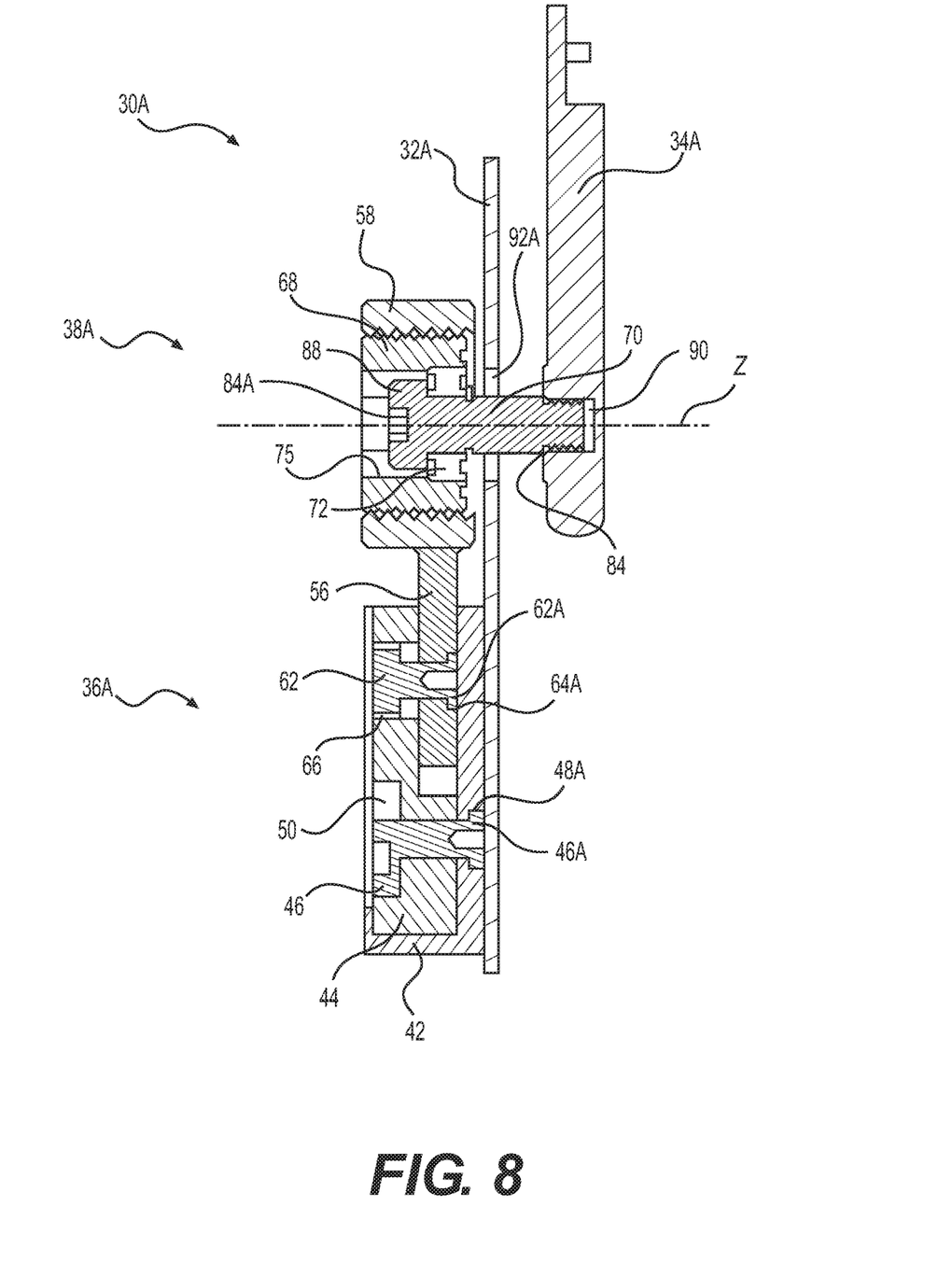
FIG. 8 is cross-sectional view of the first device of FIGS. 3A and 3B taken along line 8-8 of FIG. 3B.

FIG. 8 shows a cross-sectional view of first device 30A taken along line 8-8 of FIG. 3B. Adjustment screw 68 may be threadably engaged to head body 58 so that rotation of adjustment screw 68 may cause movement (e.g., translation) of adjustment screw 68 relative to head body 58 along hinge axis Z. Bearing 72 may be secured to adjustment screw 68 so that axial movement (i.e., along the hinge axis Z) of adjustment screw 68 may also cause axial movement (adjustment) of bearing 72 along the hinge axis Z. For example, an outer race of bearing 72 may be retained by adjustment screw 68 via swaging lip 86 or may be otherwise secure to adjustment screw 68. Coupling member 70 may, in turn, be axially coupled to bearing 72 so that axial movement of bearing 72 (and adjustment screw 68) also causes axial movement of coupling member 70. For example C-clip 80 (see FIG. 6) inserted in groove 78 may be disposed on one side of bearing 72 and head 88 of coupling member 70 may be disposed on an opposite side of bearing 72. Head 88 may comprise socket 88A or other torque-transmitting feature(s) for engagement with a suitable wrench or other type of driver.

Movable panel 24 may be coupled to coupling member 70 via arm 34A. For example, threaded portion 82 of coupling member 70 may be threadably coupled to arm 34A via receptacle 90 in arm 34A. Shoulder 84 of coupling member 70 may abut against wall 34A when threaded portion 82 is fully threaded into receptacle 90. Accordingly, movement of adjustment screw 68 along hinge axis Z may in turn cause movement of coupling member 70, arm 34A and movable panel 24 along hinge axis Z. The embodiment shown in FIG. 8 is exemplary only and it is understood that other types of attachment means between coupling member 70 and movable panel 24 could be used. In some examples, adjustment screw 68 may be used to cause movement of movable panel 24 in both directions (i.e., push and pull) along hinge axis Z. Wall 32A may extend between first mechanism 30A and arm 34A. Wall 32A may comprise hole 92A through which coupling member 70 may extend.

Figures 9A, 9B:
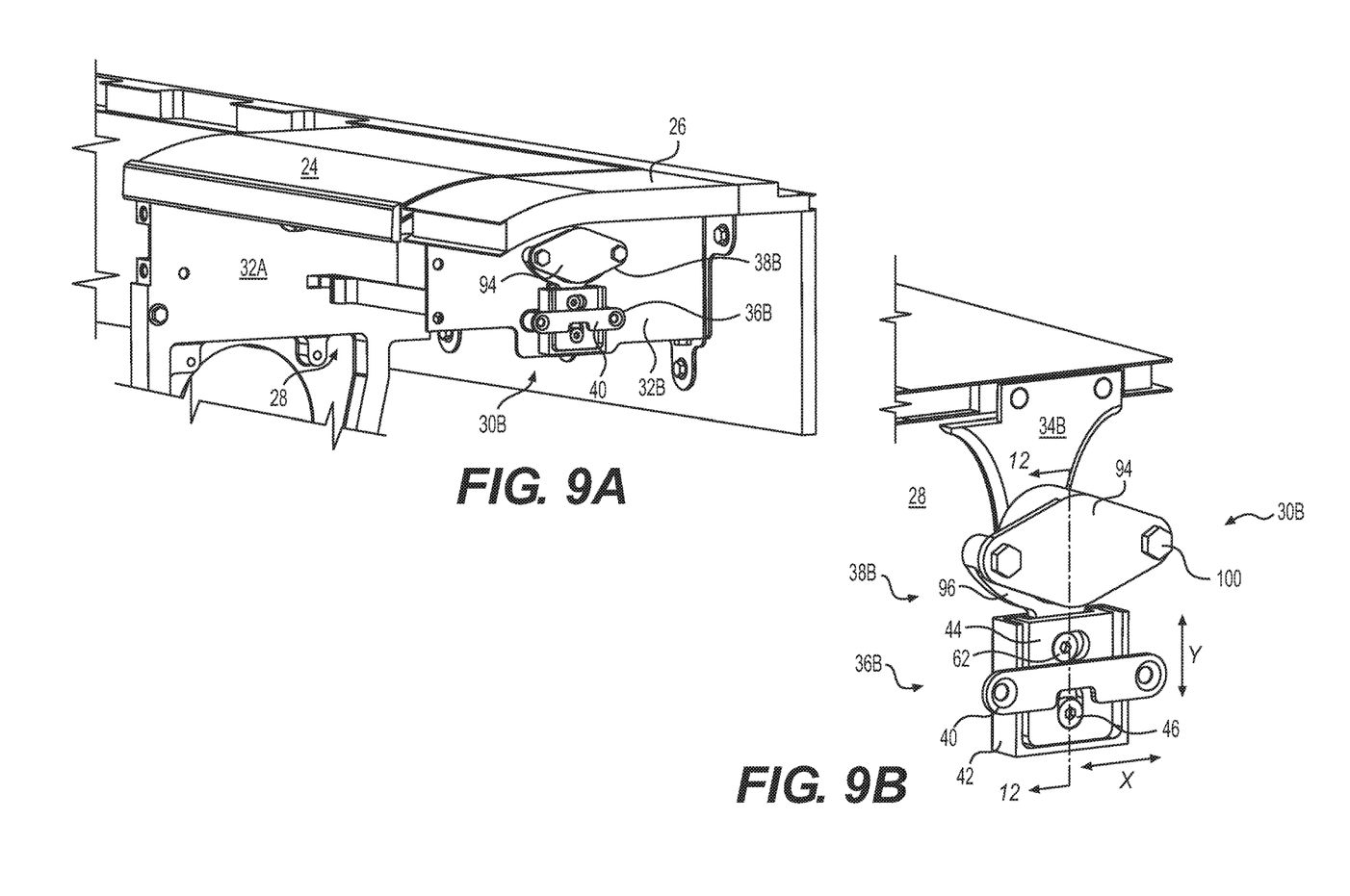
FIGS. 9A and 9B are axonometric views of a second device for adjusting a position of the movable panel of FIG. 1.

FIGS. 9A and 9B show another exemplary (e.g., second) device 30B that may be used to adjust movable panel 24. In some examples, one or more second devices 30B may be used in addition or alternatively to first device 30A to support movable panel 24. For example, first device 30A may be positioned near one lateral side of movable panel 24 and second device 30B may be positioned near an opposite lateral side of movable panel 24. Accordingly, first device 30A and second device 30B may be spaced apart from each other along hinge axis Z. In some examples, side ledge 20 may comprise an assembly of components including movable panel 24 (or other type of movable body) and one or more of first device 30A and second device 30B.

For example, first device 30A and/or second device 30B may be used to support movable panel 24, while also permit positional adjustment of movable panel 24 relative to structure. Second device 30B may also be configured to be secured to structure such as fixed structural components within the aircraft interior. Such structure may also include adjacent panel 26 even though there may be intermediate structural components between movable panel 24 and adjacent panel 26. For example, first device 30B may be configured to be secured to wall 32B and also coupled to movable panel 24 via arm 34B. Wall 32B may include and/or be part of a structural member within side ledge 20. Wall 32B may, for example, define a portion of storage compartment 28, which may also be partially defined (e.g., covered) by movable member 24 when movable member 24 is in the closed position. Wall 32B may be oriented transversely (e.g., perpendicular) to hinge axis Z.

Second device 30B may comprise base portion 36B configured to be secured to wall 32B and head portion 38B configured to be rotatably coupled to movable panel 24 via arm 34B. Base portion 36B may be configured to be secured to a side of wall 32B opposite storage compartment 28. For example, like base portion 36A, base portion 36B may be secured to wall 32B via one or more brackets 40 and/or one or more suitable fasteners (not shown). Head portion 38B may be adjustably coupled to base portion 36B. For example, head portion 38B may be adjustable along one or more directions (e.g., X and/or Y) relative to base portion 36B and/or relative to wall 32B. Head portion 38B may be configured to allow movement of movable panel 24 along hinge axis Z. Accordingly, while controlled adjustment of the axial position (i.e., along hinge axis Z) of movable panel 24 may be done via adjustment screw 68 of first device 30A, head portion 38B of second device 30B may allow for (e.g., not substantially restrict) such axial movement of movable panel 24.

Figure 10A:
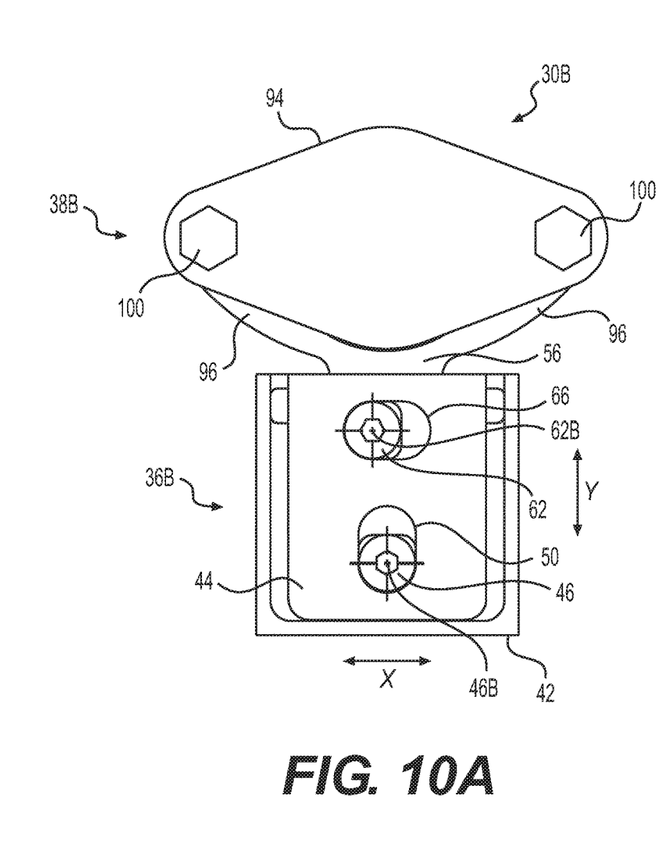
FIGS. 10A and 10B are elevation views showing opposite sides of the second device of FIGS. 9A and 9B.
Figure 10B:
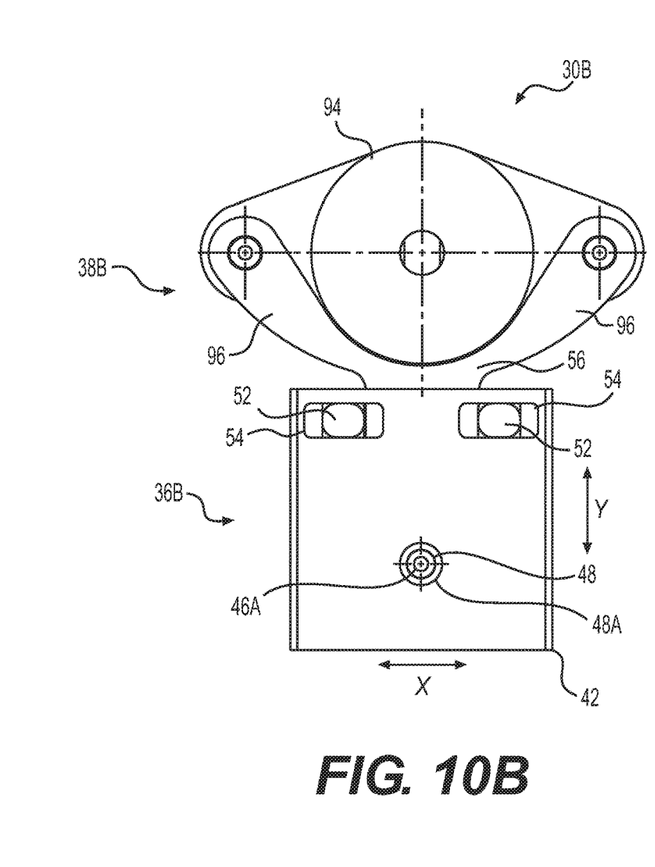

FIGS. 10A and 10B show opposite sides of second device 30B. FIG. 10A shows a side of second device 30B opposite of wall 32B and FIG. 10B shows a side of second device 30B configured to be installed against (e.g., interface with) wall 32B. In some examples, base portion 36B of second device 30B may be substantially identical to and/or functionally equivalent to base portion 36A of first device 30A. Base portion 36B shown in the accompanying figures is substantially identical to base portion 36A of first device 30A, which has already been described above, and therefore will not be repeated. Like reference numerals are used to identify like components of base portion 36A and base portion 36B.

Head portion 38B may comprise tab 56 configured to extend into and engage inner block 44 via slot 60 (shown in FIG. 7) so that movement of inner block 44 along the X direction may also cause movement of head portion 38A along the X direction. Accordingly, similar to head portion 38A, head portion 38B may also be adjustable along the X and Y directions via the adjustment mechanisms provided in base portion 36B.

Figure 11:
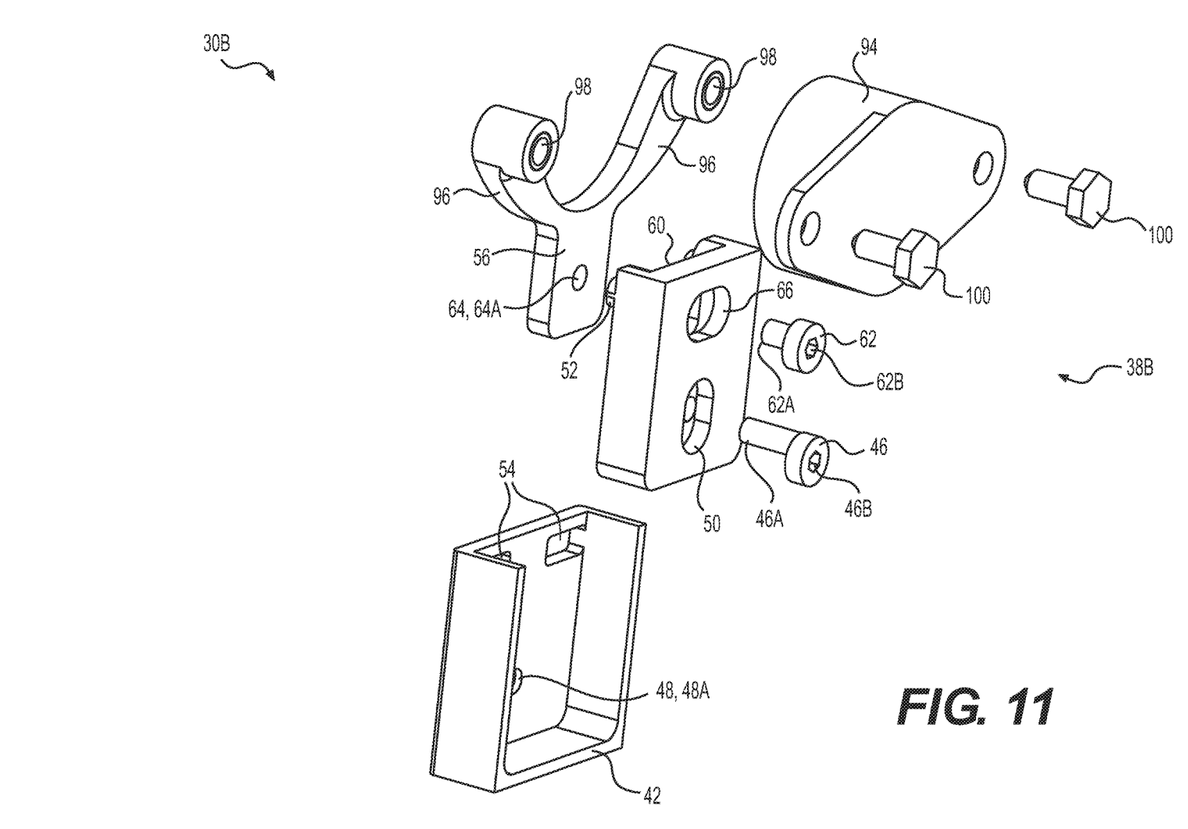
FIG. 11 is an exploded axonometric view of the second device of FIGS. 9A and 9B.

FIG. 11 shows an exploded view of second device 30B. Head portion 38B may comprise tab 56 configured to extend into slot 60 of inner block 44 of base portion 36B. Head portion 38B may also comprise means for securing damper 94 to head portion 38B. For example, head portion 38B may comprise one or more arms 96 including one or more fastening holes 98, with which damper 94 may be secured using fasteners 100. Damper 94 may be configure to couple with movable panel 24 and dampen the movement of movable panel 24 during the opening and/or closing of movable panel 24.

Figure 12:
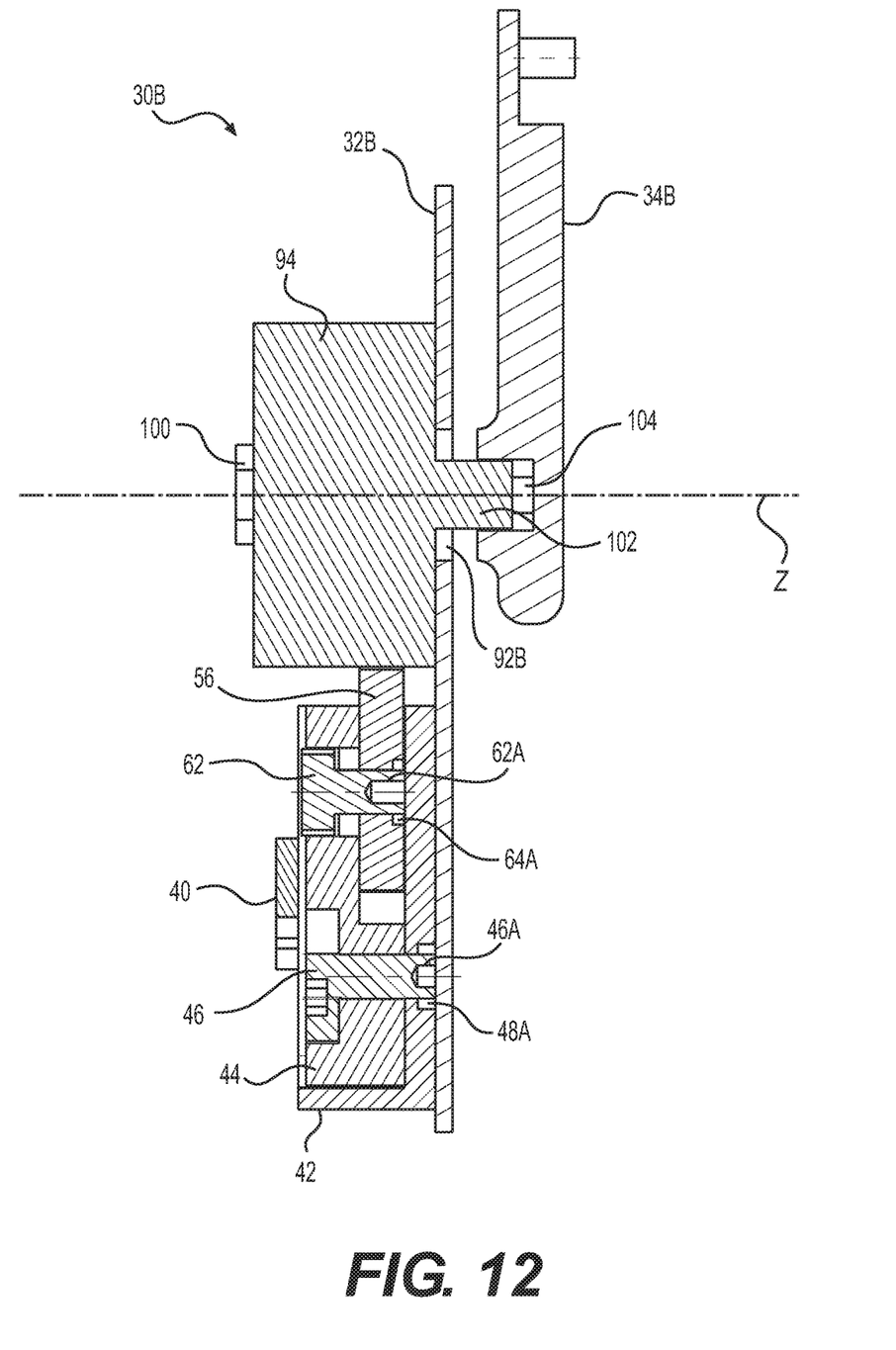
FIG. 12 is cross-sectional view of the second device of FIGS. 8A and 8B taken along line 11-11 of FIG. 8B.

FIG. 12 shows a cross-sectional view of first device 30A taken along line 11-11 of FIG. 9B. As shown, damper 94 may comprise coupler 102 configured to interface with arm 34B of movable panel 24. Coupler 102 may be configured to receive rotational movement of movable panel 24 so that damper 94 may dampen the movement. Damper 94 is shown as a rotary-type damper but is it understood that in applications where movable panel 24 may undergo translational movement instead of or in addition to rotational movement, one or more suitable dampers of conventional or other type could be used to dampen such translational and/or rotational movement of movable panel 24. For example, coupler 102 of damper 94 may comprise one or more flats thereon or other torque-transmitting feature(s) permitting the transmission of rotational movement between damper 94 and movable panel 24. Coupler 102 may be coupled to arm 34B via corresponding receptacle 104. In some examples, a suitable rotary damper 94 may be part number SRT-D2-102 sold under the trade name SUGASTUNE.

Head portion 38B of second device 30B may be configured to allow for adjustment of movable panel 24 along hinge axis Z relative to wall 32B and/or other structural components. For example, while coupler 102 may serve to transfer rotational movement between arm 34B and damper 94, some relative axial movement (i.e., along hinge axis Z) may be permitted between coupler 102 and arm 34B so that axial adjustment of movable panel 24 made via first device 30A may not be restricted by any significant amount by second device 30B. For example, relative sliding movement along hinge axis Z may be permitted between arm 34B and coupler 102.

During installation of movable panel 24 in side ledge 20, one or more of first device 30A and/or one or more of second device 30B may be used to support movable panel 24 relative to structure. For example, first device 30A may be used to support one lateral side of movable panel 24 and second device 30B may be used to support another lateral side of movable panel 24. Base portions 36A and 36B may be secured to walls 32A and 32B and head portions 38A and 38B may be rotatably coupled to movable panel 24.

The use of such first device 30A and/or second device 30B may permit positional adjustment of panel 24 relative to adjacent panel 26 and/or other structure of side ledge 20. For example, as explained above, first device 30A and/or second device 30B may permit positional adjustment along the X, Y directions and also along hinge axis Z. Adjustments of movable panel 24 along the X and/or Y directions may be controllably effected using adjustment mechanisms provided in base portions 36A and 36B (e.g., via cam screws 46 and 62). Adjustment along hinge axis Z may be controllably effected via the adjustment mechanism provided in head portion 38A of first device 30A. For example, adjustment along hinge axis Z may be controllably effected via adjustment screw 68 of first device 30A while axial sliding movement between coupler 102 of second device 30B and arm 34B may be permitted to allow for substantially unrestricted axial movement of movable panel 24 at second device 30B.

Such adjustment along the X, Y and/or Z directions may be made during initial installation of movable panel 24 and/or during maintenance operations if and as needed. Bracket 40 may be used to secure base portions 36A and 36B to walls 32A and 32B respectively. In some examples, bracket 40 could be configured to provide some degree of locking of the adjustment mechanisms provided in base portions 36A and 36B. For example, bracket 40 could be configured to press inner block 44 and tab 56 inside casing 42 and substantially prevent movement of movable panel 24 along the X and Y directions. In other examples, bracket 40 could be configured to secure casing 42 to walls 32A, 32B while still allowing adjustments along the X and Y directions to be made via cam screws 46 and 62. Wall 32B may extend between second mechanism 30B and arm 34B. Wall 32B may comprise hole 92B through which coupler 102 may extend.

It is understood that movable panel 24 may not necessarily be part of a side ledge of an aircraft interior but could instead be any other type of body movable relative to another structure such as, for example, a door or lid rotatably or otherwise movably coupled to another structure. For example, such movable body could include a door to a closet, cupboard, cabinet or other type of furniture for aircraft or other applications. For example, such movable/rotatable bodies also could be part of furnishings that are routinely assembled and disassembled for temporary applications such as displays and could benefit from such adjustment devices. Movable panel 24 may be planar, curved and/or have any shape suitable for the particular application.

The above description is meant to be exemplary only, and one skilled in the relevant arts will recognize that changes may be made to the embodiments described without departing from the scope of the invention disclosed. For example, while exemplary devices 30A and 30B describe herein each have multiple adjustment mechanisms, it is understood that devices 30A and/or 30B could have fewer or more adjustment mechanisms than those shown and could be otherwise configured. The present disclosure may be embodied in other specific forms without departing from the subject matter of the claims. Also, one skilled in the relevant arts will appreciate that while the components, devices and assemblies disclosed and shown herein may comprise a specific number of elements, the components, devices and assemblies could be modified to include additional or fewer of such elements/components. For example, while any of the elements/components disclosed may be referenced as being singular, it is understood that the embodiments disclosed herein could be modified to include a plurality of such elements/components.

The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A device for adjusting a position of a body relative to a structure where the body is rotatable about a hinge axis, the device comprising:
   a first portion configured to be secured to the structure; and
   a second portion adjustably coupled to the first portion and configured to be rotatably coupled to the body, the second portion comprising an adjustment mechanism for adjusting the body along the hinge axis relative to the second portion, wherein:
   the adjustment mechanism of the second portion comprises an adjustment screw configured to cause translation of the body along the hinge axis upon rotation of the adjustment screw;
   the adjustment screw is configured to cause translation of a coupling member coupled to the rotatable body upon rotation of the adjustment screw;
   the coupling member extends through the adjustment screw; and
   the adjustment screw is translatable along the hinge axis.

2. The device as defined in claim 1, wherein the adjustment screw and the body are rotatably coupled to each other.

3. The device as defined in claim 1, wherein the coupling member and the adjustment screw are rotatably coupled to each other.

4. The device as defined in claim 1, wherein the coupling member and the adjustment screw are substantially coaxial.

5. The device as defined in claim 1, wherein the coupling member and the adjustment screw are axially secured to each other.

6. The device as defined in claim 1, wherein the adjustment screw is substantially coaxial with the hinge axis.

7. The device as defined in claim 1, wherein the second portion is adjustable relative to the first portion along a first direction and a second direction transverse to the first direction, the first direction and the second direction being transverse to the hinge axis.

8. The device as defined in claim 1, wherein the first portion is configured to be secured to a surface that is transverse to the hinge axis.

9. A device for adjusting a position of a body relative to a structure where the body is rotatable about a hinge axis, the device comprising:
   a first portion configured to be secured to the structure, the first portion comprising a first adjustment mechanism and a second adjustment mechanism; and
   a second portion coupled to the first portion and configured to be rotatably coupled to the body, the second portion being adjustable relative to the structure via the first adjustment mechanism and the second adjustment mechanism of the first portion, the second portion comprising a third adjustment mechanism for adjusting the body along the hinge axis, wherein:

the third adjustment mechanism comprises an adjustment screw configured to cause translation of the rotatable body along the hinge axis upon rotation of the adjustment screw; and the adjustment screw and the rotatable body are rotatably coupled to each other via a bearing.

10. The device as defined in claim 9, wherein:

the first adjustment mechanism is configured to permit adjustment of the second portion along a first direction; and the second adjustment mechanism is configured to permit adjustment of the second portion along a second direction transverse to the first direction.

11. The device as defined in claim 10, wherein the first direction and the second direction are transverse to the hinge axis.

12. The device as defined in claim 9, wherein the first portion is configured to be secured to a surface that is transverse to the hinge axis.

* * * * *